United States Patent
Asaro et al.

(10) Patent No.: US 8,935,475 B2
(45) Date of Patent: Jan. 13, 2015

(54) CACHE MANAGEMENT FOR MEMORY OPERATIONS

(75) Inventors: Anthony Asaro, Toronto (CA); Kevin Normoyle, Los Gatos, CA (US); Mark Hummel, Franklin, MA (US); Norman Rubin, Cambridge, MA (US); Mark Fowler, Hopkinton, MA (US)

(73) Assignees: ATI Technologies ULC, Ontario (CA); Advanced Micro Devices, Inc., Sunnyvale, CA (US)

(*) Notice: Subject to any disclaimer, the term of this patent is extended or adjusted under 35 U.S.C. 154(b) by 357 days.

(21) Appl. No.: 13/436,767

(22) Filed: Mar. 30, 2012

(65) Prior Publication Data

US 2013/0262775 A1 Oct. 3, 2013

(51) Int. Cl.
G06F 12/02 (2006.01)
G06F 12/08 (2006.01)
G06F 12/12 (2006.01)

(52) U.S. Cl.
CPC ........ *G06F 12/0891* (2013.01); *G06F 12/0837* (2013.01); *G06F 12/128* (2013.01); *G06F 12/123* (2013.01); *G06F 12/0815* (2013.01); *G06F 12/126* (2013.01)
USPC ........... 711/118; 711/130; 711/135; 711/156; 711/158

(58) Field of Classification Search
CPC . G06F 12/0891; G06F 12/123; G06F 12/126; G06F 12/128; G06F 12/0815; G06F 12/0837
USPC .......................... 711/118, 130, 135, 156, 158
See application file for complete search history.

(56) References Cited

U.S. PATENT DOCUMENTS

| | | | |
|---|---|---|---|
| 5,729,710 A * | 3/1998 | Magee et al. | 711/203 |
| 5,761,708 A * | 6/1998 | Cherabuddi et al. | 711/118 |
| 6,226,671 B1 * | 5/2001 | Hagersten et al. | 709/215 |
| 6,266,767 B1 * | 7/2001 | Feiste et al. | 712/217 |
| 6,446,089 B1 * | 9/2002 | Brodersen et al. | 1/1 |
| 6,578,071 B2 * | 6/2003 | Hagersten et al. | 709/215 |
| 6,725,337 B1 * | 4/2004 | Tan et al. | 711/133 |
| 7,657,710 B2 * | 2/2010 | Loewenstein | 711/141 |
| 7,877,549 B1 * | 1/2011 | Panwar et al. | 711/141 |
| 7,996,621 B2 * | 8/2011 | Brown et al. | 711/133 |
| 8,095,617 B2 * | 1/2012 | Johnsen et al. | 709/212 |
| 2011/0219208 A1 * | 9/2011 | Asaad et al. | 712/12 |

* cited by examiner

*Primary Examiner* — Stephen Elmore
(74) *Attorney, Agent, or Firm* — Volpe and Koening, P.C.

(57) ABSTRACT

Embodiments of the present invention provides for the execution of threads and/or workitems on multiple processors of a heterogeneous computing system in a manner that they can share data correctly and efficiently. Disclosed method, system, and article of manufacture embodiments include, responsive to an instruction from a sequence of instructions of a work-item, determining an ordering of visibility to other work-items of one or more other data items in relation to a particular data item, and performing at least one cache operation upon at least one of the particular data item or the other data items present in any one or more cache memories in accordance with the determined ordering. The semantics of the instruction includes a memory operation upon the particular data item.

20 Claims, 5 Drawing Sheets

CACHE MANAGEMENT FOR MEMORY OPERATIONS

BACKGROUND

1. Field of the Invention

The present invention is generally directed to computing systems. More particularly, the present invention is directed to memory operations executed in a heterogeneous computing system.

2. Background Art

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market (e.g., notebooks, mobile smart phones, tablets, etc.) and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available primarily for the acceleration of graphics. These constraints arose from the fact that GPUs did not have as rich a programming ecosystem as CPUs. Their use, therefore, has been mostly limited to two dimensional (2D) and three dimensional (3D) graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) separate memory systems, (ii) efficient scheduling, (iii) providing quality of service (QoS) guarantees between processes, (iv) programming model, and (v) compiling to multiple target instruction set architectures (ISAs)—all while minimizing power consumption.

For example, the discrete chip arrangement forces system and software architects to utilize chip to chip interfaces for each processor to access memory. While these external interfaces (e.g., chip to chip) negatively affect memory latency and power consumption for cooperating heterogeneous processors, the separate memory systems (i.e., separate address spaces) and driver managed shared memory create overhead that becomes unacceptable for fine grain offload.

SUMMARY OF EMBODIMENTS

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner with respect to resources such as conventional CPUs, conventional GPUs, and/or combinations thereof.

Embodiments of the present invention provide for the execution of threads and/or workitems on multiple processors of a heterogeneous computing system in a manner that they can share data correctly and efficiently. Disclosed embodiments include, responsive to an instruction from a sequence of instructions of a work-item, determining an ordering of visibility to other work-items of one or more other data items in relation to a particular data item, and performing at least one cache operation upon at least one of the particular data item or the other data items present in any one or more cache memories in accordance with the determined ordering. The semantics of the instruction includes a memory operation upon the particular data item.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF EMBODIMENTS OF THE INVENTION

In the detailed description that follows, references to "one embodiment," "an embodiment," "an example embodiment,"

etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Embodiments of the present invention may be used in any computer system, computing device, entertainment system, media system, game systems, communication device, personal digital assistant, or any system using two or more processors. The present invention is particularly useful where the system comprises a heterogeneous computing system such as the systems illustrated in FIG. 1. A "heterogeneous computing system," as the term is used herein, is a computing system in which multiple types of processors are available. The multiple types of processors can include, for example, CPUs and APDs such as CPUs.

Embodiments of the present invention enable threads and workitems executing on multiple processors, including processors of different types, to efficiently share data while ensuring the integrity of the data items accessed by the workitems. Ensuring the integrity of accessed data items includes ensuring that the value of a read returns the latest value of that data item regardless of where that data item was last updated. Embodiments perform cache operations as a side effect of a memory operation in order to enforce a determined visibility ordering of data items that are accessed by memory operations. A data item is said to be "visible" to a workitem when it is in a memory that is accessible to that workitem. For a data item to be "visible" to workitems executing on multiple processors, that data item should be in a common memory that is shared by all the multiple processors. The "visibility ordering" (also referred to as "ordering of visibility") of data items, as described below, is a partial ordering of the order in which data items are made visible (i.e., available for access) to workitems across multiple processors. Embodiments use the determined visibility ordering to reduce the overhead associated with cache operations associated with memory operations. The caches associated with the respective processors, such as the CPUs and APDs, can be managed, using embodiments disclosed herein, to perform cache operations (e.g., cache flush, cache invalidate) with reduced traffic between the respective caches and the system memory.

Figure 1:
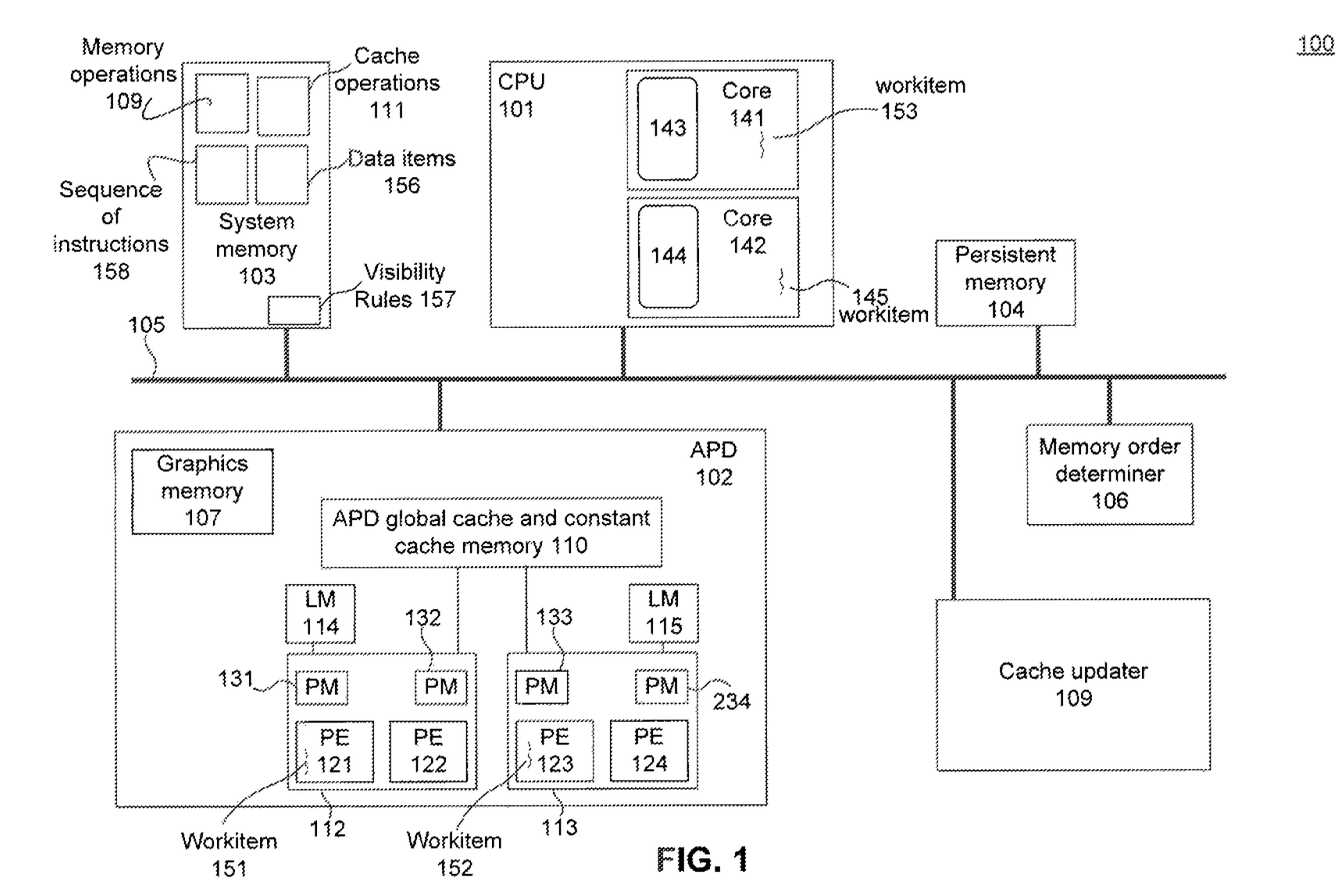
FIG. 1 is another illustrative block diagram of a processing system, in accordance with an embodiment.

An example heterogeneous computing system 100 is shown in FIG. 1, according to an embodiment of the present invention. Heterogeneous computing system 100 can include one or more CPUs, such as CPU 101, and one or more APDs, such as APD 102. Heterogeneous computing system 100 can also include at least one system memory 103, at least one persistent storage device 104, at least one system bus 105, memory order determiner 106, and a cache updater 109.

In one embodiment of the present invention, the system 100 is formed on a single silicon die or package, combining CPU 101 and APD 102 to provide a unified programming and execution environment. This environment enables the APD 102 to be used as fluidly as the CPU 101 for some programming tasks. However, it is not an absolute requirement of this invention that the CPU 101 and APD 102 be formed on a single silicon die. In some embodiments, it is possible for them to be formed separately and mounted on the same or different substrates.

CPU 101 can include a commercially available control processor or a custom control processor. CPU 101 can include one or more of a control processor, field programmable gate array (FPGA), application specific integrated circuit (ASIC), or digital signal processor (DSP). CPU 101, according to one embodiment, initiates and controls the execution of an application by, for example, distributing the processing associated with that application across the CPU 101 and other processing resources, such as the APD 102. CPU 101, for example, executes control logic that controls the operation of heterogeneous computing system 100. CPU 101 can be a multi-core CPU, such as a multi-core CPU with two CPU cores 141 and 142. CPU 101, in addition to any control circuitry, can include CPU cache memory such as the cache memories 143 and 144 of CPU cores 141 and 142, respectively. CPU cache memories 143 and 144 can be used to temporarily hold instructions and/or parameter values during the execution of an application on CPU cores 141 and 142, respectively. For example, CPU cache memory 143 can be used to temporarily hold one or more control logic instructions, values of variables, or values of constant parameters, from the system memory 103 during the execution of control logic instructions on CPU core 141. In some embodiments, CPU 101 can also include specialized vector instruction processing units. For example, CPU core 142 can include a Streaming SIMD Extensions (SSE) unit that can efficiently process vectored instructions. A person skilled in the art will understand that CPU 101 can include more or less than the CPU cores in the example chosen, and can also have either no cache memories, or more complex cache memory hierarchies.

APD 102 can execute specialized code for selected functions. For example, APD 102 can be used to execute graphics functions such as graphics pipeline computations such as geometric computations and rendering of image on a display. APD 102 may be a GPU. In general, APD 102 may be preferred for the execution of data-parallel code. APD 102 can include its own compute units (not shown), such as, but not limited to, one or more single instruction multiple data (SIMD) processing cores.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in order to process such data elements in parallel. As referred to herein, for example, a compute kernel is a function containing instructions declared in a program and executed on an APD compute unit. This function is also referred to as a kernel, a shader, a shader program, or a program.

APD 102 can include an APD global cache memory 110 and one or more compute units 112 and 113. A graphics memory 107 can be included in, or coupled to, APD 102. Each compute unit 112 and 113 are associated with an APD local memory 114 and 115, respectively. Each compute unit includes one or more APD processing elements (PE). For example, compute unit 112 includes APD processing elements 121 and 122, and compute unit 113 includes APD processing elements 123 and 124. Each APD processing element 121, 122, 123, and 124, is associated with at least one private memory (PM) 131, 132, 133, and 134, respectively. Each APD processing element can include one or more of a scalar and vector floating-point units. The APD processing elements can also include special purpose units such as inverse-square root units and sine/cosine units. APD global cache memory 110 can be coupled to a system memory such as system memory 103, and/or graphics memory such as graphics memory 107. According to an embodiment, APD global cache memory 110 may include two or more levels of cache memories. Graphics memory 107 may not be limited to graphics.

System memory 103 can include at least one non-persistent memory such as dynamic random access memory (DRAM). System memory 103 can hold processing logic instructions, constant values and variable values during execution of portions of applications or other processing logic. For example, in one embodiment, the control logic and/or other processing logic of memory order determiner 106 and cache updater 109 can reside within system memory 103 during execution. The term "processing logic," as used herein, refers to control flow instructions, instructions for performing computations, and instructions for associated access to resources.

Persistent memory 104 includes one or more storage devices capable of storing digital data such as magnetic disk, optical disk, or flash memory. Persistent memory 104 can, for example, store at least parts of instruction logic of memory order determiner 106 and cache updater 109. For example, at the startup of heterogeneous computing system 100, the operating system and other application software can be loaded in to system memory 103 from persistent storage 104.

System bus 105 can include a Peripheral Component Interconnect (PCI) bus, Advanced Microcontroller Bus Architecture (AMBA) bus, Industry Standard Architecture (ISA) bus, or such a device. System bus 105 can also include a network such as a local area network (LAN). System bus 105 includes the functionality to couple components including components of heterogeneous computing system 100.

Graphics memory 107 is coupled to system bus 105 and to APD 102. Graphics memory 107 is, in general, used to hold data transferred from system memory 103 for fast access by the APD. For example, the interface between APD 102 and graphics memory 107 can be several times faster than the system bus interface 105.

Memory order determiner 106 and cache updater 109 include processing logic respectively to determine visibility requirements of data items and to execute cache operations in accordance with embodiments. Memory order determiner 106 may be configured to determine visibility requirements of a set of data items according to a set of visibility rules 157. For example, in response to receiving an instruction such as an instruction with load acquire semantics or store release semantics (described below), memory order determiner 106 may be configured to find a set of data items accessed in a sequence of instructions and to determine a relative ordering of visibility between the set of data items and the data item accessed by the current instruction. Cache updater 109 may be configured to perform cache operations such that the visibility ordering of data items that is determined by memory order determined 106 is achieved. The functionalities of memory order determiner 106 and cache updater 109 are described below in relation to FIGS. 2-5. Memory order determiner 106 and cache updater 109 can be implemented using software, firmware, hardware, or any combination thereof. When implemented in software, memory order determiner 106 can be a computer program, that when compiled and executed resides in system memory 103. In source code form and/or compiled executable form, memory order determiner 106 and cache updater 109 can be stored in persistent memory 104 or other computer readable storage medium. In one embodiment, some or all of the functionalities of memory order determiner 106 and cache updater 109 are specified in a hardware description language such as Verilog, RTL, netlists, to enable ultimately configuring a manufacturing process through the generation of maskworks/photomasks to generate a hardware device embodying aspects of the invention described herein.

A person of skill in the art will understand that heterogeneous computing systems 100 and 100 can include more or less components than shown in FIG. 1.

Compute kernels may include data-parallel kernels and task-parallel kernels. In general, CPUs are better suited to execute task-parallel kernels, whereas data-parallel kernels are better suited for APD execution. Both CPUs and APDs can execute multiple instances of a compute kernel in parallel. Each instance of an executing compute kernel may be referred to as a "workitem." In APD 102, for example, workitems may simultaneously execute on each processing element 121, 122, 123, and 124. In CPU 101, workitems may simultaneously execute on each core 141 and 142. FIG. 1 illustrates a workitems 151, 152, 153 and 154 executing respectively in processing elements 121 and 123 in APD 102, and in cores 141 and 142 of CPU 101.

System memory 103 may include sequence of instructions 158. Sequence of instructions 158 may be a sequence of instructions from an application (not shown). The application may be executing on CPU 101 and may execute compute kernels or programs in APD 102 and/or CPU 101. Sequence of instructions 158 may have the instructions in order of how the respective instructions appear in the source code, or in order of how a compiler orders the respective source code instructions. Data items 156 represent data items that are accessed by instructions in sequence of instructions 158. Data items 156 can include data in system memory 103 and/or in any one or more of the cache or local memories in the respective CPU cores or APD. Memory operations 109 and cache operations 111 include executable code for respectively implementing memory operations and cache operations from sequence of instructions 158.

Figure 2:
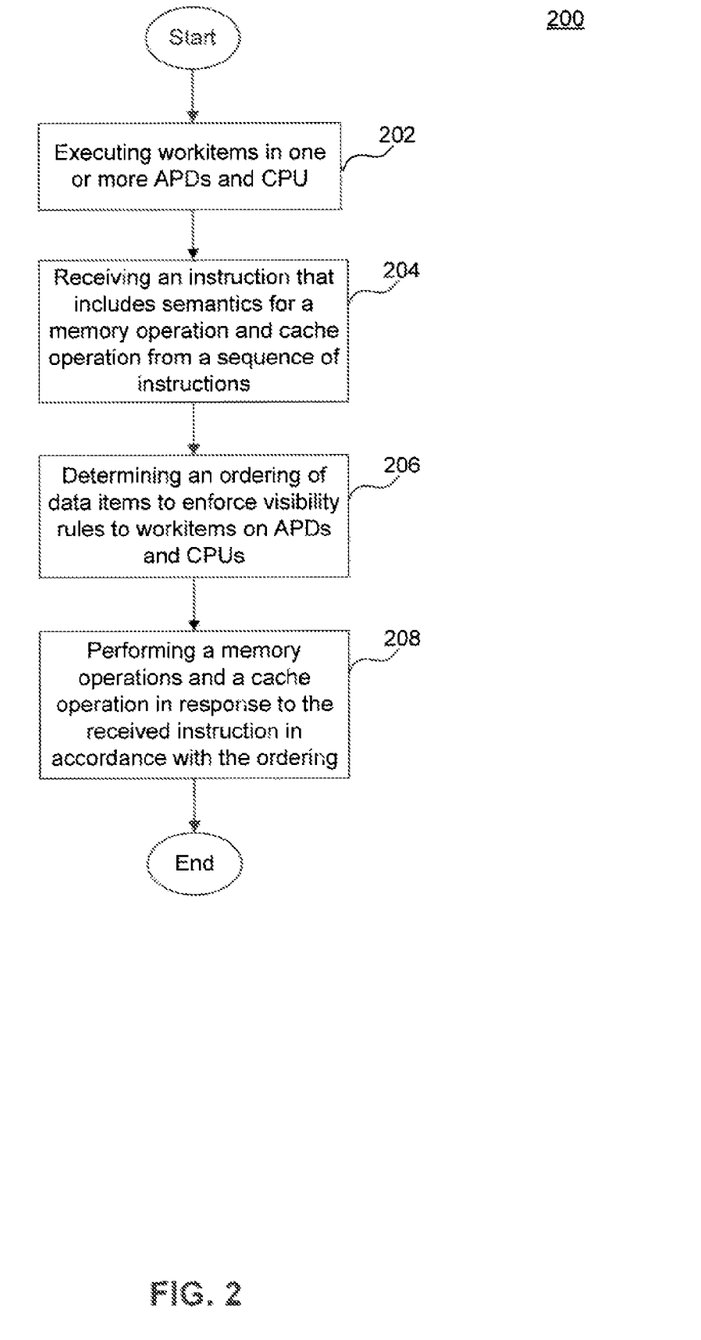
FIG. 2 is a flowchart illustrating a method for performing cache operations, according to an embodiment of the present invention.

FIG. 2 illustrates a method 200 (processes 202-208) for executing memory operations in a heterogeneous computing system, in accordance with an embodiment. At process 202, workitems are executed on one or more CPUs and/or one or more APDs. For example, workitems may be executed simultaneously in CPU cores 141 and 142, and processing elements 121-224 of APD 102. The workitems may execute the same sequence of instructions, such as sequence of instructions 158, or different sequences of instruction. According to an embodiment, the workitems may access a common unified address space that includes system memory accessible to the CPU cores and to processing elements of the APD. The respective CPU cores, processing elements of the APD, compute units within APD, and APD may have their respective private memories and/or cache memories. For example, workitems executing on CPU cores 141 and 142 may access CPU caches 143 and 144 respectively, and system memory 103. Workitems executing on APD processing element 121 may access private memory 131, the local memory 114 of the compute unit 112 in which processing element 121 is located, graphics memory 107 of APD 102, APD global cache and constant cache 110, and system memory 103.

At process 204, an instruction from a sequence of instructions of the executing one or more workitems is received. According to an embodiment, the received instruction is from a workitem executing on an APD. The sequence of instructions can include one or more memory operations. Memory operations include instructions for performing an operation on one or more data items in memory. Memory operations can include load (or read) operations and store (or write) operations. A load operation reads one or more data items from memory to registers in order that workitems can access those data items. A store operation writes one or more data items from a register to memory. The sequence of instructions may include one or more instruction types that perform load operations. Similarly, one or more instruction types in the sequence may be configured for store operations. The instruction received at process 204 may be a memory operation, such as a load operation or store operation, which includes semantics to perform one or more cache operations to enforce a relative visibility ordering of data items accessed by the received instruction and the sequence of instructions.

At process 206, a visibility ordering of data items accessed by instructions in the sequence of instructions is determined in relation to the instruction received at process 204. The relative ordering of the visibility of data items is determined so that one or more visibility rules are enforced. The rides are directed to ensuring the correctness of values of data items when those data items are accessed (e.g., are written and/or read) by a single workitem or multiple workitems executing on the same or different processors or processing elements.

The ordering of instructions in the source code is not necessarily the order in which instructions are executed. The compiler, and/or other component, may reorder the instructions in some situations to be different than the order in the sequence of instructions in the source code. In some other situations, the hardware may reorder the execution of the instructions differently than the order of instruction issue. In still other situations, such as in the embodiment illustrated in FIG. 1 in which respective processors have one or more local and/or cache memories, the visibility of the latest value of a data item to workitems executing on the same processor or different processors may be different. The visibility of data items may be different because, for example, the latest values of those data items may not be propagated to the system memory (e.g., the common memory accessible to separate processors in the system) from respective local memories or cache memories, or because the latest values are not propagated from the system memory to respective local memories or cache memories. The visibility of data items may also be affected by each processor first accessing and/or writing that data item to a local memory or cache, and only subsequently writing that data item to a common memory shared with other processors. The ordering of data item visibility determined in process 206, may be directed to selectively ensuring that data items are correctly visible to the workitems that access those data items. The visibility ordering of data items and rules (referred to herein as "visibility rules") for ordering is further described below in relation to FIG. 3.

At process 208, one or more cache operations are performed in accordance with the visibility ordering determined at process 206. Cache operations can include one or more of a cache flush or a cache invalidate operation. The cache flush may be performed to write data items that are updated in a local or cache memory to system memory, so that those data items are visible to workitems executing on the same or different processors. According to an embodiment, the cache flush operation may be selectively performed in order to flush one or more selected data items, rather than flushing all the values in the one or more caches. Selectively flushing data items from the cache results in less traffic between the caches and system memory, when compared to flushing entire caches. Cache invalidate operation may be performed in order to mark copies of a data item invalid in one or more other caches when that data item is updated in one cache or system memory. According to embodiments, the invalidate operation may be performed on selected caches rather than all caches. Selecting of data items to be flushed in flush operations and selecting of caches to be invalidated in an invalidate operation may be performed in accordance with rules to enforce an ordering of memory operations. According to an embodiment, one or more of the above descried cache flush or cache invalidate operation are performed in response to an instruction that includes an associated load or store operation. The performing of cache operations is further described in relation to FIG. 5 below.

Figure 3:
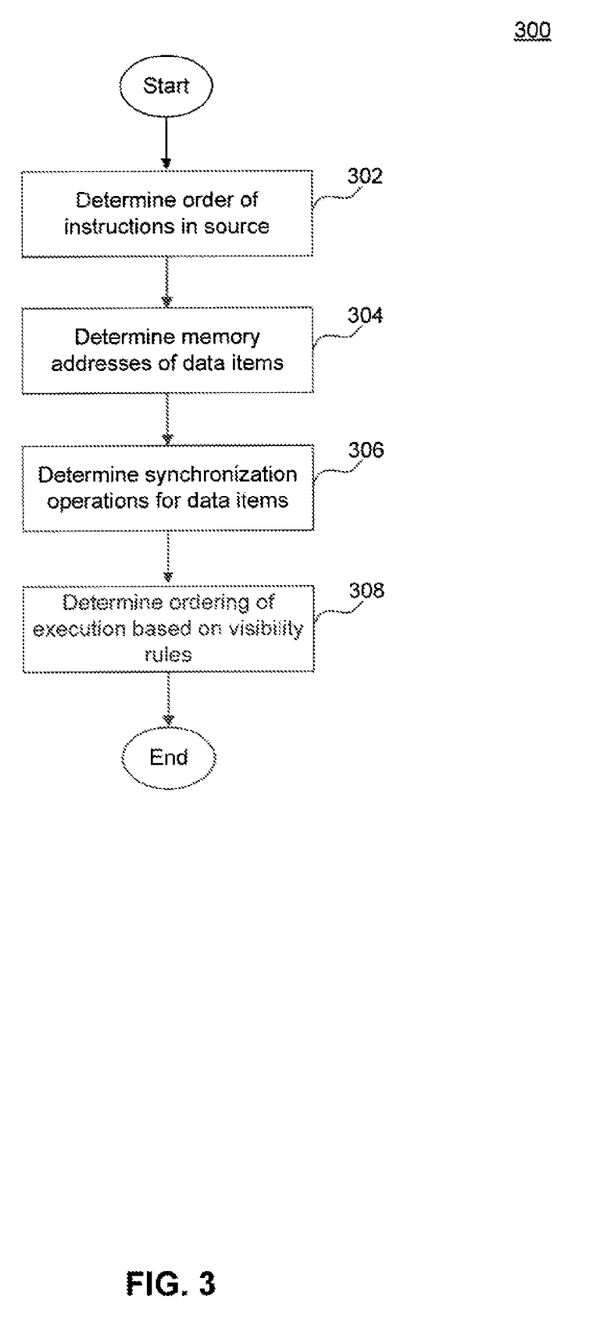
FIG. 3 is a flowchart illustrating, a method for ordering memory operations, according to an embodiment of the present invention.

FIG. 3 illustrates a flowchart of a method 300 (processes 302-308) for determining a relative ordering of the visibility of data items accessed in a sequence of instructions and a data item accessed in a currently received instruction having a memory operation, in accordance with an embodiment of the present invention. Method 300 can be used, for example, in performing process 206 of method 200 described above.

Method 300 determines the relative visibility ordering of data items accessed in a sequence of instructions in accordance with visibility rules. The visibility rules may include preconfigured rules. In some embodiments, the rules may also include one or more dynamically generated rules. Dynamically generated rules can adapt the system to current system conditions. For example, if the interface between the caches and system memory is not loaded with traffic in excess of a threshold, the visibility rules may be adjusted by removing the reduction of memory traffic from goals to be considered.

At process 302, the ordering of the sequence of instructions in the source code is determined. In general, the ordering of the instructions in the source code reflects the intent of the programmer for ordering or the various operations. The ordering of the instructions in the source code may be one of the considerations in selecting applicable ordering rules.

At process 304, the memory address of data items associated with the instructions is determined.

At process 306, it is determined whether respective memory operations and corresponding instructions are related by a synchronization operation. Synchronization operations are operations, such as barrier( ) and sync( ) operations that explicitly cause workitems to wait for one or more other workitems to reach a corresponding point in their instruction sequences.

At process 308, the visibility ordering of data items for the sequence of instructions is determined. The ordering of execution may be based upon the characteristics of the sequence of instructions determined in one or more of processes 302-306 and on a set of rules of ordering. The rules may include preconfigured rules and dynamically configured rules. The visibility ordering may be in relation to the one or more data items accessed by the current received instruction from the sequence of instructions.

The visibility rules, in accordance with an embodiment, specify a "sequenced before" ordering between instructions.

Sequenced-before is an asymmetric, transitive, pair-wise relation between instructions executed by a single workitem, which induces a partial ordering among those instructions. Given any two instructions X and Y, if X is sequenced before Y, then the execution of X shall precede the execution of Y. If A is not sequenced before Y and Y is not sequenced before X, then X and Y are not sequenced. The phrase "X sb Y" is used herein to denote that X is sequenced before Y.

In the description below, for two different memory operations X and Y in sequenced-before order for a workitem: X sb Y specifies that X is before Y in sequenced-before order; X>>Y indicates that Y must be visible only after X is visible; and transitivity for a single work-item applies if X>>Y and Y>>Z, then X>>Z.

The rules may specify that, if X sb Y, then an ordering of the sequence of instructions should be according to conditions that include the following:

If X and Y are to the same address, X>>Y;
If X and Y are to different addresses, and there is a barrier or sync operation between them, then X>>Y;
If X is a load acquire or atomic operation with acquire functionality and Y is any other memory operation to any location, then X>>Y;
If X is a load operation and Y is any other memory operation to any location such that an address dependency exists from value returned by X, where the value of the address is not invariant with changes to the value returned by X, then X>>Y; and
If X is any memory operation to any location and Y is a store release, then X>>Y.

Further rules may enforce conditions among multiple workitems, such as:

There is a single order (which is also a total order) of all stores per memory location, by any work-item;
All load acquire and store release operations order as in sequential consistency. There is coherence on all load acquire and store release operations to a single address. Coherence is a serialization of all loads and stores, not just stores;
X→Y implies that a store X, in some work-item, synchronizes with a load Y, in another (different) work-item;
When an operation X, such as a store release or atomic operation with release functionality, from a work-item provides the data to any load Y from another work-item, X is visible before all operations Z such that Y>>Z and X→Y>>Z;
When an atomic operation X (Atomic operations, according to an embodiment, are single operations that atomically combine the requirements of a load and a store, with no store from another work-item becoming visible between the load and store.) from a work-item provides the data to any load Y from another work-item, X is visible before all operations Z such that Y>>Z and X→Y>>Z; and
The barrier and sync operations synchronize work-items and act as full A>>B fences.

The visibility rules described above provide for an execution ordering of instructions in the sequence of instructions. The relative visibility ordering of the data items accessed by the sequence of instructions can be determined based upon the rules. As described in relation to FIGS. 4 and 5, the visibility ordering of the data items may be used to optimize cache operations to minimize traffic between system memory and cache memories.

Figure 4:
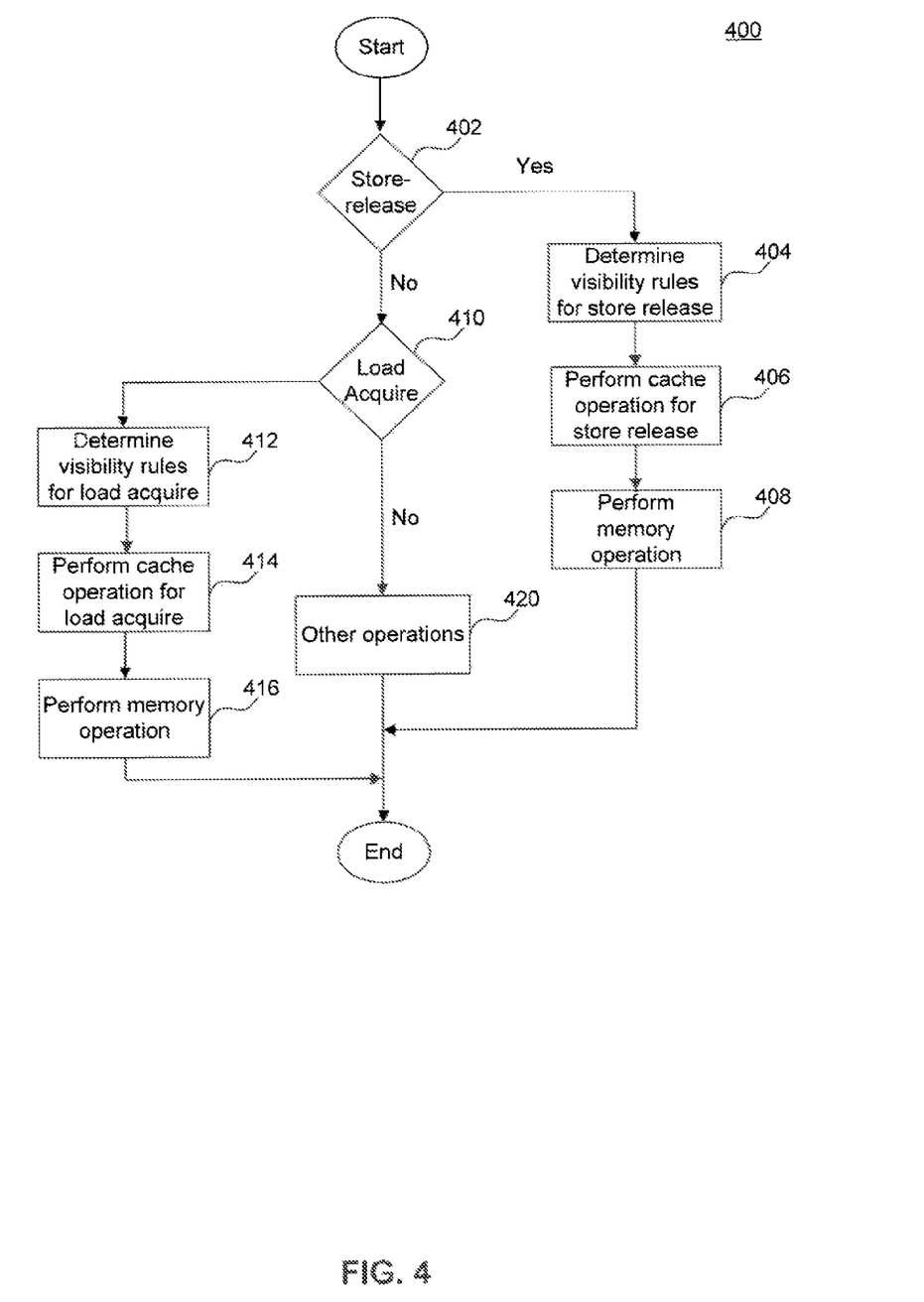
FIG. 4 is a flowchart illustrating a method for executing memory operations, according to an embodiment of the present invention.

FIG. 4 illustrates a flowchart of a method 400 (processes 402-416) to perform memory operations, in accordance with an embodiment of the present invention. Method 400 can be used, for example, in performing process 208 of method 200 described above.

At process 402, it is determined whether the instruction includes a store release functionality. According to an embodiment, the store release functionality may be included in the semantics for a store release instruction type, and an atomic instruction type with store release. The semantics for store release, for example, considering an instruction such as store release Y, includes writing data item Y to a memory (local or system) and ensuring that, for any data item X such that X sb Y, X is visible before Y.

If at process 402, it is determined that the instruction includes store release semantics, then method 400 proceeds to process 404. At process 404, the rules applicable to the received instruction are determined. The determination of the applicable rules may be based upon the type of instruction (e.g., instruction with store release semantics) and the data items that are accessed by the received instruction. According to an embodiment, based upon the type of instruction and the data items accessed, the applicable ordering rules can be determined from the sequenced before rules described above.

At process 406, cache operations in accordance with the determined rules are executed. The executed cache operations can include cache flush operations. According to an embodiment, the flush operation selectively flushes data items that are required to be visible before the currently accessed data item. As noted above, selectively flushing data items from cache, may result in a reduction in traffic between system memory and cache memories. According to another embodiment, the flush operation may be performed for all data items in cache. Cache operations are further described below in relation to FIG. 5.

At process 408, the memory operation corresponding to the received instruction is performed. For example, the data item X accessed by a received store release instruction may be written to memory. Writing of data item X to memory, in executing a store release operation includes, writing data item X to system memory so that X would be visible to other workitems. The writing of X may include writing of X to a local or cache memory and to system memory. The operation may or may not include a flush operation specifically for data item X. Note that, in accordance with store release semantics, any other data items Y that were required to be visible before the currently accessed data item X would have already been made visible by a technique such as, for example, selectively flushing one or more caches for those data items Y. Completion of process 408, completes the processing of the operation with store release semantics.

If, at process 402, it was determined that the received instruction does not include store release semantics, method 400 proceeds to process 410. At process 410, it is determined whether the received instruction includes load acquire semantics. According to an embodiment, load acquire semantics may be included in instructions of a type load acquire, and in atomic instructions that have a load acquire aspect. The semantics for load acquire of a data item Y, for example, includes accessing Y only after any other data items X, where X sb Y, have already been made visible before Y.

At process 412, the rules applicable to the received instruction type (e.g., instruction with load acquire semantics) and accessed one or more data items are determined. According to an embodiment, based upon the type of instruction and the data items accessed, the applicable ordering rules can be determined from the sequenced before rules described above.

At process 414, cache operations in accordance with the determined rules are executed. The executed cache operations can include cache flush operations. According to an embodiment, the flush operation selectively flushes data items that are required to be visible before the currently accessed data item. As noted above, selectively flushing data items from cache, may result in a reduction in traffic between system memory and cache memories. According to another embodiment, the flush operation may be performed for all data items in cache. Cache operations are further described below in relation to FIG. 5.

At process 416, the memory operation corresponding to the received instruction is performed. For example, the data item Y accessed by a received load acquire instruction may be read from memory. Reading data item Y from memory, in executing a load acquire operation, may include ensuring that any data items X where X sb Y are made visible to workitems before X is read. Completion of process 416, completes the processing of the operation with load acquire semantics.

If at process 410, it is determined that the received instruction does not include load acquire semantics, then at process 420 processing of the received instruction may be performed in accordance with corresponding instruction semantics.

Figure 5:
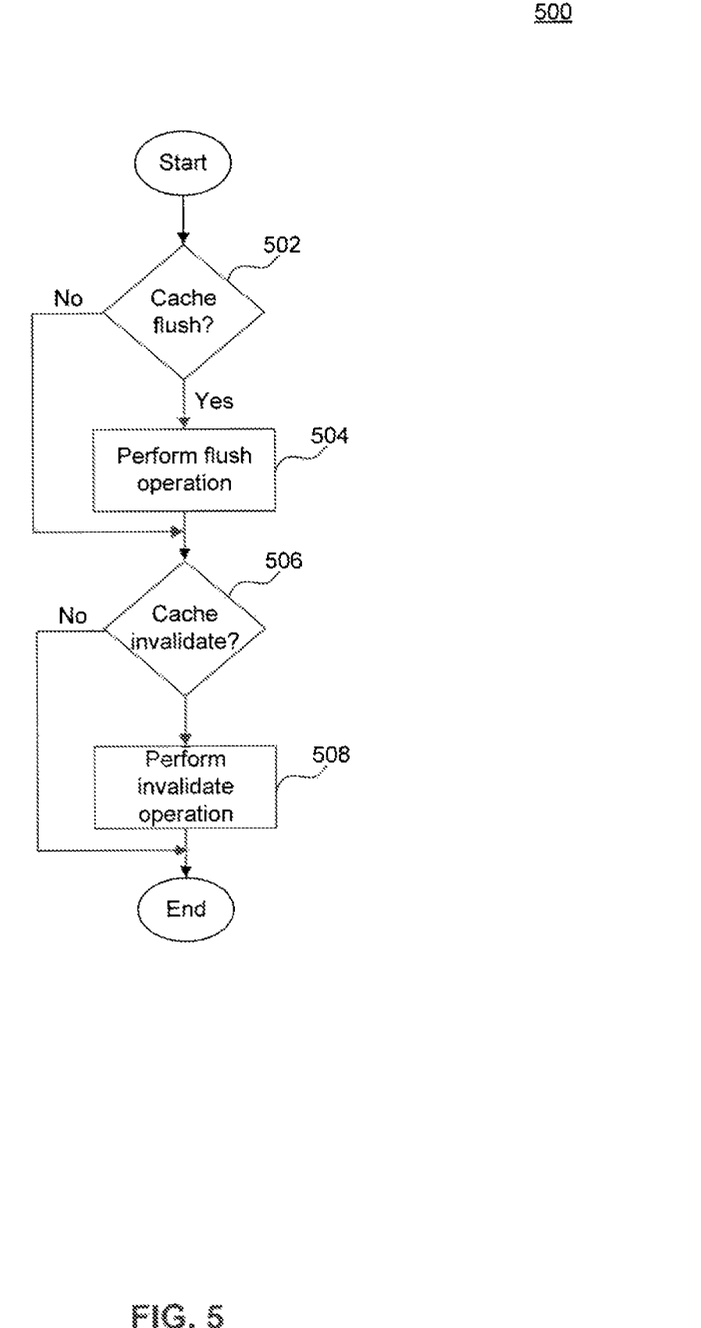
FIG. 5 is a flowchart illustrating a method for executing cache operations corresponding to the memory operations of FIG. 4, according to an embodiment of the present invention.

FIG. 5 illustrates a flowchart of a method 500 (processes 502-508) to perform cache operations in executing memory operations in accordance with an embodiment. For example, method 500 can be used in performing processes 408 and/or 414 of method 400 described above.

At process 502, it is determined whether a cache flush operation is required to be performed. Both types of memory operations discussed above, operations with load acquire semantics and operations with store release semantics, require that one or more cache flush operations are performed. For example, a store release Y instruction may require that one or more caches are flushed such that any data item X, where X sb Y is visible to workitems before Y is written. Likewise, a load acquire Y instruction may require that one or more caches are flushed such that any data item X, where X sb Y is visible to workitems before Y is read.

If a cache flush is required, at process 504, one or more cache operation are performed. According to an embodiment, as described above, the one or more cache flush operations may include selectively flushing data items from caches to system memory. The selective flushing of data items may be performed in order to enforce the required "sequenced before" ordering rules, described above with reduced traffic between the one or more caches and the system memory. The selective flushing may be based upon flushing individual data items, or upon areas (or blocks) of cache memory. According to another embodiment, the entire cache may be flushed in one or more caches.

At process 506, it is determined whether a cache invalidate operation is required. A cache invalidate operation may be required, for example, for a store release Y instruction in order to write the new value of data item Y and then to mark all cached instances of data item Y as invalid. A load acquire Y operation may not require a cache invalidate operation.

At process 508, if required, the cache invalidate operation is performed. The cache invalidation operation can be performed to invalidate one or more selected data items. According to an embodiment, instances of data item Y in all caches are invalidated. According to another embodiment, the invalidation of instances of data item X may be performed only in selected caches. For example, the "sequenced before" rules may indicate that the instances of data item Y in one or more caches may not require invalidation in order to be compliant with the rules.

Method 500 may be repeated for each memory operation performed in order to perform cache operations as required.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
responsive to an instruction from a sequence of instructions of a work-item performed by a processor in a heterogeneous computing system, determining an ordering of visibility to other work-items of one or more other data items in relation to a particular data item, wherein semantics of the instruction includes a memory operation upon the particular data item; and
performing at least one cache operation upon at least one of the particular data item or the other data items present in any one or more cache memories in accordance with the determined ordering,
wherein the heterogeneous computing system includes one or more central processing units (CPUs) and one or more Advanced Processing Devices (APDs).

2. The method of claim 1, wherein the cache operation includes at least one of a cache flush operation or a cache invalidate operation.

3. The method of claim 1, wherein the determining an ordering includes: determining the ordering in accordance with a set of visibility rules.

4. The method of claim 3, wherein the determining the ordering in accordance with a set of visibility rules comprises:
identifying a relative ordering of the instruction and respective instructions corresponding to the other data items, wherein the relative ordering is based, at least in part, upon positions of the instruction and the respective instructions in the sequence of instructions.

5. The method of claim 4, wherein the relative ordering is further based upon memory addresses associated with the particular data item and the one or more other data items.

6. The method of claim 4, wherein the relative ordering is further based upon whether there is a synchronization operation between the particular data item and the one or more other data items.

7. The method of claim 1, wherein the performing at least one cache operation includes:

identifying one or more caches having a subset of the other data items, wherein the subset includes data items sequenced before the particular data item;

writing the subset to a common memory from the identified one or more caches; and writing the particular data item in accordance with the instruction to the common memory, wherein the memory operation is a store operation, and wherein the writing of the particular data item is executed after the writing of the subset.

8. The method of claim 7, wherein the performing at least one cache operation further includes:

invalidating entries in respective ones of the one or more caches, wherein the invalidated entries correspond to the particular data item.

9. The method of claim 1, wherein the performing at least one cache operation includes:

identifying one or more caches having a subset of the other data items, wherein the subset includes data items sequenced before the particular data item;

writing the subset to a common memory from the identified one or more caches; and reading the particular data item in accordance with the instruction, wherein the memory operation is a load operation, and wherein the reading of the particular data item is executed after the writing of the subset.

10. The method of claim 1, wherein the performing at least one cache operation includes:

selectively flushing data items from one or more caches, in accordance with the determined ordering.

11. The method of claim 1, wherein the performing at least one cache operation includes:

selectively invalidating data items from one or more caches, in accordance with the determined ordering.

12. A system comprising:

a central processing unit (CPU);

an advanced processing device (APD);

a common memory accessible to the CPU and the APD;

one or more cache memories, wherein each cache memory is associated with the CPU or the APD;

a memory order determiner configured to execute on one or more of the CPU or the APD, and further configured to:

responsive to an instruction from a sequence of instructions of a work-item, determine an ordering of visibility to other work-items of one or more other data items in relation to a particular data item, wherein semantics of the instruction includes a memory operation upon the particular data item; and a cache updater configured to:

perform at least one cache operation upon at least one of the particular data item or the other data items present in any one or more cache memories in accordance with the determined ordering.

13. The system of claim 12, wherein the memory order determiner is further configured to:

determining the ordering in accordance with a set of visibility rules.

14. The system of claim 13, wherein the memory order determiner is further configured to:

identify a relative ordering of the instruction and respective instructions corresponding to the other data items, wherein the relative ordering is based, at least in part, upon positions of the instruction and the respective instructions in the sequence of instructions.

15. An article of manufacture comprising a non-transitory computer readable storage medium having instructions encoded thereon that, in response to execution by a computing device in a heterogeneous computing system, cause the computing device to perform operations comprising:

responsive to an instruction from a sequence of instructions of a work-item, determining an ordering of visibility to other work-items of one or more other data items in relation to a particular data item, wherein semantics of the instruction includes a memory operation upon the particular data item; and performing at least one cache operation upon at least one of the particular data item or the other data items present in any one or more cache memories in accordance with the determined ordering, wherein the heterogeneous computing system includes one or more central processing units (CPUs) and one or more Advanced Processing Devices (APDs).

16. The article of manufacture of claim 15, wherein the determining an ordering includes:

determining the ordering in accordance with a set of visibility rules.

17. The article of manufacture of claim 16, wherein the determining the ordering in accordance with a set of visibility rules comprises:

identifying a relative ordering of the instruction and respective instructions corresponding to the other data items, wherein the relative ordering is based, at least in part, upon positions of the instruction and the respective instructions in the sequence of instructions.

18. An apparatus for sharing data between work-items the apparatus includes one or more central processing units (CPUs) and one or more Advanced Processing Devices (APDs) being configured to:

responsive to an instruction from a sequence of instructions of a work-item, determine an ordering of visibility to other work-items of one or more other data items in relation to a particular data item, wherein semantics of the instruction includes a memory operation upon the particular data item; and perform at least one cache operation upon at least one of the particular data item or the other data items present in any one or more cache memories in accordance with the determined ordering.

19. The apparatus of claim 18, further configured to:

determine the ordering in accordance with a set of visibility rules.

20. The apparatus of claim 19, further configured to:

identify a relative ordering of the instruction and respective instructions corresponding to the other data items, wherein the relative ordering is based, at least in part, upon positions of the instruction and the respective instructions in the sequence of instructions.

* * * * *